S. G. PEABODY.
Wheel Cultivator.
No. 84,575.
Patented Dec. 1, 1868.
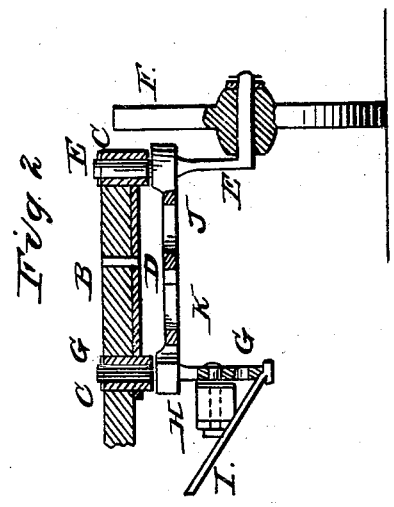
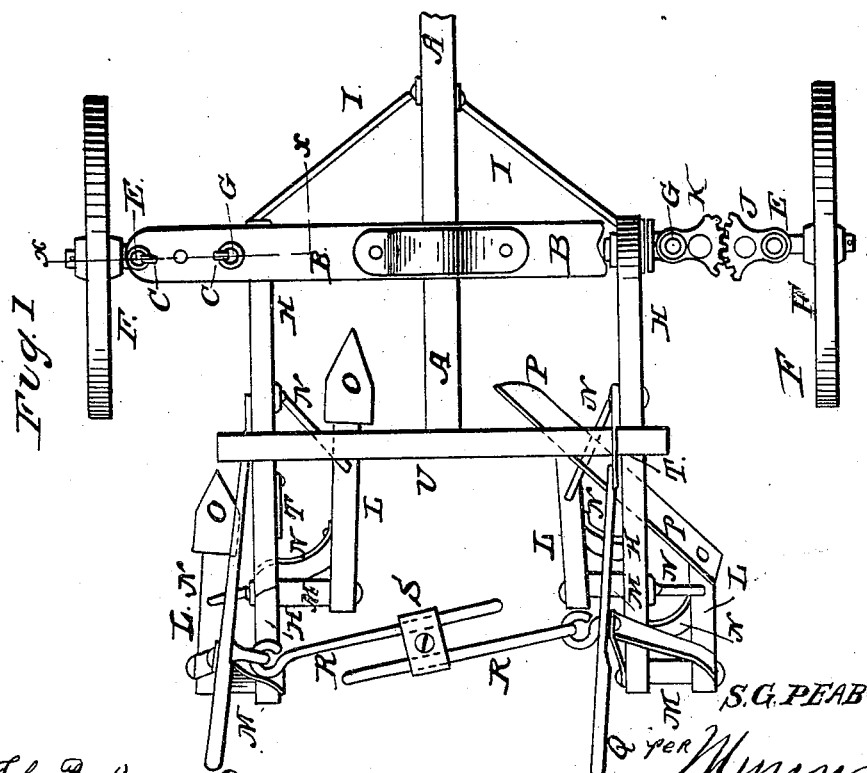

S. G. PEABODY, OF CHAMPAIGN, ILLINOIS.

Letters Patent No. 84,575, dated December 1, 1868.

IMPROVEMENT IN CULTIVATORS.

The Schedule referred to in these Letters Patent and making part of the same.

*To all whom it may concern:*

Be it known that I, S. G. PEABODY, of Champaign, in the county of Champaign, and State of Illinois, have invented a new and useful Improvement in Cultivators; and I do hereby declare that the following is a full, clear, and exact description thereof, which will enable others skilled in the art to make and use the same, reference being had to the accompanying drawings, forming part of this specification.

Figure 1 is a top or plan view of my improved cultivator, part being broken away to show the construction.

Figure 2 is a detail sectional view of the same, taken through the line $x\ x$, fig. 1.

Similar letters of reference indicate corresponding parts.

My invention has for its object to furnish an improved cultivator, which shall be so constructed and arranged that the direction of the wheels may be easily changed by the operator, so that the direction of the plows may be instantly changed by the advance of the wheels in the new direction, thus enabling the machine to be easily and accurately guided in plowing crooked rows, or in avoiding irregular hills; and It consists in the construction and combination of various parts, as hereinafter more fully described.

A is the tongue, to which the cross-bar B is securely attached.

In the cross-bar B, near each end, are formed two holes, in which are placed metallic bushes or tubes C, which are secured in place by the plate D, to which they are securely attached, or upon which they are formed, and which is securely bolted to the said cross-bar, as shown in fig. 2.

E are shafts or arms, the upper ends of which are swivelled in the outer ones of the bushes or tubes C.

The lower ends of the shafts or arms E are bent outward at right angles, to form axles for the wheels F, as shown in fig. 2.

G are shafts or arms, the upper ends of which are swivelled in the inner ones of the bushes or tubes C.

The lower parts of the vertical shafts G are flattened, and have several holes formed through them for the reception of the bolts, by which the forward ends of the plow-beams H are adjustably pivoted to said shafts G.

The lower ends of the shafts G are supported against the draught-strain by the braces I, the rear ends of which are secured to the lower ends of the said shafts G, and the upper ends of which are secured to the tongue A.

J is a gear-wheel or the segment of a gear-wheel, which is attached to or formed upon the shaft or arm E, and the teeth of which mesh into the teeth of the gear-wheel or segment of a gear-wheel, K, formed upon or attached to the shaft G, so that by moving the rear ends of the beams H to the right or left, the direction of the wheels F may be instantly changed to the right or left.

L are the plow-standards, which are securely attached to the rear parts of the beams H, by bolts which pass through the upper ends of the said standards, and through the said beams.

The standards L are kept at the desired distance from the beams H by blocks M, interposed between the said standards and beams, as shown in fig. 1, and they are further secured in place and strengthened against the draught-strain by the braces N, as shown.

To the lower ends of the standards L are attached shovels or plows O or scrapers P, according to the purpose for which the cultivator is to be used, said plows or scrapers being adjusted to throw the soil towards or from the plants, as may be desired.

Q are the handles, the forward ends of which are secured to the beams H, and the rear ends of which are supported by braces attached to the rear part of the beams H.

The handles Q are adjustably connected to each other by the rods R, the outer ends of which are pivoted to the said handles Q, and the inner ends of which are adjustably secured to each other by the clamp S, so that the said handles may be secured to each other at any desired distance apart.

T are hooks pivoted to the beams H, and which may be hooked upon the cross-bar U, attached to the rearwardly-projecting end of the tongue A, to hold the plows away from the ground when passing from place to place.

Having thus described my invention,

I claim as new, and desire to secure by Letters Patent—

1. An arrangement of mechanism, by means of which the direction of the wheels F may be changed by the lateral movement of the plow-beams H, substantially as herein shown and described, and for the purpose set forth.

2. The combination of the bushes or tubes C, swivelled shaft or axle E, gear-wheels or segments of gear-wheels J K, and swivelled shaft G, with each other, and with the wheel F, cross-bar B, and plow-beams H, substantially as herein shown and described, and for the purpose set forth.

S. G. PEABODY.

Witnesses:
A. H. STARR,
E. B. AYRES.